US007792236B2

(12) United States Patent
Rozhkov et al.

(10) Patent No.: US 7,792,236 B2
(45) Date of Patent: Sep. 7, 2010

(54) FUEL ASSEMBLY AND PLUG-IN DISTANCE ELEMENT

(75) Inventors: Vladimir Vladimirovich Rozhkov, Novosibirsk (RU); Petr Ivanovich Lavrenyuk, Moscow (RU); Aleksandr Antonovich Kislitsky, Novosibirsk (RU); Vladimir Mikhailovich Troyanov, Obninsk, Kaluzhskaya obl. (RU); Anatoly Alekseevich Enin, Novosibirsk (RU); Mstislav Aleksandrovich Shustov, Novosibirsk (RU); Aleksandr Pavlovich Ustimenko, Novosibirsk (RU); Mikhail Mikhailovich Nekhoda, Novosibirsk (RU); Oleg Borisovich Samoilov, Nizhny Novgorod (RU); Aleksey Borisovich Dolgov, Moskovskaya obl., g.Podolsk (RU)

(73) Assignees: OAO "TVEL", Moscow (RU); OAO "Novosibirsky Zavod Khimkontsentratov", Novosibirsk (RU)

( * ) Notice: Subject to any disclaimer, the term of this patent is extended or adjusted under 35 U.S.C. 154(b) by 0 days.

(21) Appl. No.: 12/278,773

(22) PCT Filed: Apr. 12, 2007

(86) PCT No.: PCT/RU2007/000176
§ 371 (c)(1),
(2), (4) Date: Aug. 7, 2008

(87) PCT Pub. No.: WO2008/079042
PCT Pub. Date: Jul. 3, 2008

(65) Prior Publication Data
US 2009/0067566 A1    Mar. 12, 2009

(30) Foreign Application Priority Data
Dec. 22, 2006   (RU) ............................... 2006145699

(51) Int. Cl.
    *G21C 3/34* (2006.01)
(52) U.S. Cl. .................. 376/438; 376/439; 376/441; 376/443
(58) Field of Classification Search ................ 376/438, 376/439, 441, 443, 446, 453
    See application file for complete search history.

(56) References Cited

U.S. PATENT DOCUMENTS 3,457,140 A * 7/1969 Glandin ....................... 376/442

(Continued)

FOREIGN PATENT DOCUMENTS

EP        0192534 B1    8/1986

(Continued)

*Primary Examiner*—Rick Palabrica
(74) *Attorney, Agent, or Firm*—Bardmesser Law Group

(57) ABSTRACT

This invention relates to nuclear engineering and may be used in structures of nuclear fuel assemblies, especially those used in PWR and BWR nuclear reactors. A fuel assembly comprises spacing grids comprising cells formed by orthogonal crossing plates. An insertable spacing element is installed in each cell, which is designed for fixing the fuel rod passing through the cell. In the spacing grids that are arranged between the first spacing grid and the last spacing grid downstream the coolant flow at least some cells, through which the fuel rods pass, are provided with deflectors designed for mixing the coolant flow. The insertable spacing element comprises a shell, which has a cross-section in the form of an octagon formed by four facets that are rounded and convex in the direction from the center of said element and by four facets located therebetween that are shaped and concave toward the center of the said element. The result is that cell stiffness is increased, and hydraulic resistance to a coolant flow is reduced.

6 Claims, 4 Drawing Sheets

U.S. PATENT DOCUMENTS

| | | | |
|---|---|---|---|
| 3,787,286 A * | 1/1974 | Anthony | 376/439 |
| 3,791,466 A * | 2/1974 | Patterson et al. | 376/442 |
| 3,984,284 A * | 10/1976 | Long et al. | 376/442 |
| 4,081,324 A * | 3/1978 | Flora et al. | 376/441 |
| 4,411,862 A * | 10/1983 | Leclercq et al. | 376/442 |
| 4,585,616 A | 4/1986 | DeMario et al. | |
| 4,692,303 A * | 9/1987 | Osborne | 376/446 |
| 4,780,273 A * | 10/1988 | Dressel | 376/441 |
| 4,879,090 A * | 11/1989 | Perrotti et al. | 376/462 |
| 4,988,474 A * | 1/1991 | Hoffmann et al. | 376/261 |
| 5,032,351 A * | 7/1991 | Johansson | 376/438 |
| 5,089,221 A * | 2/1992 | Johansson et al. | 376/442 |
| 5,186,891 A * | 2/1993 | Johansson et al. | 376/438 |
| 5,243,635 A | 9/1993 | Bryan | |
| 5,327,470 A * | 7/1994 | Johansson | 376/438 |
| 5,361,288 A * | 11/1994 | Johansson | 376/441 |
| 5,365,557 A | 11/1994 | Meseth | |
| 5,440,599 A | 8/1995 | Rodack et al. | |
| 5,862,196 A | 1/1999 | Wolfram | |
| 5,875,223 A | 2/1999 | Nylund | |
| 6,236,702 B1 | 5/2001 | Chun et al. | |
| 6,473,482 B1 * | 10/2002 | Steinke | 376/442 |
| 6,526,116 B1 | 2/2003 | Nguyen et al. | |
| 6,816,563 B2 * | 11/2004 | Nylund | 376/439 |
| 2006/0153327 A1 | 7/2006 | Jiang | |

FOREIGN PATENT DOCUMENTS

| | | |
|---|---|---|
| EP | 1679722 A1 | 7/2006 |
| RU | 2124239 C1 | 12/1998 |
| RU | 2192051 C2 | 10/2002 |
| WO | WO 2005069308 A 1 | 7/2005 |

\* cited by examiner

FUEL ASSEMBLY AND PLUG-IN DISTANCE ELEMENT

FIELD OF THE INVENTION

This invention relates to nuclear engineering and may be used in structures of nuclear fuel assemblies formed of a bundle of fuel rods that are spaced and fixed in spacing grids, in particular in fuel assemblies for PWR and BWR reactors wherein fuel rods are arranged according to a square pattern.

PRIOR ART

In order to ensure a required spacing between fuel rods during the whole life of a fuel assembly spacing grids are used that also fix fuel rods in pressed positions for the purpose of excluding fretting wear of fuel rod cladding materials. Cells of spacing grids may be formed, in particular, by orthogonal crossing plates or by pressing from tube blanks and connecting them therebetween and with a surrounding rim by welding or soldering.

In order to eliminate cross overflows between fuel assemblies their spacing grids should have close hydraulic characteristics and be located at similar levels.

In order to prevent spacing grids of abutting fuel assemblies from engaging at overloads their rims are provided with lead-in edges.

Torsional stiffness of guide tubes depends on the configuration of cells in spacing grids.

The requirements to assemblability of fuel rods as well as to easy removal of fuel rods during repairs of a fuel rod assembly leads to the necessity of using compliant cells. At the same time, in order to ensure a pre-set torsional stiffness rigid cells are required.

Furthermore, elements performing the function of mixing a coolant should be provided for in spacing grid designs.

A fuel assembly comprising spacing grids is known, wherein spacing grids comprise cells formed by orthogonally crossing strips, as well as coolant flow whirl devices (U.S. Pat. No. 5,365,557, G 21 3/322, 15 Nov. 1994). Strips of that design have shaped cutouts that are twisted differently.

As to the technical essence and achieved result, the closest to this invention is a fuel assembly comprising spacing grids arranged longitudinally along the coolant flow and comprising cells formed by orthogonal crossing plates, wherein an insertable spacing element is installed in each cell through which a fuel rod passes, said insertable spacing element enclosing said fuel rod and being designed for fixing said fuel rod passing through said cell (EP 01925346, G 21 C 3/34, 31 Jan. 1986).

Also, as to the technical essence and achieved result, the closest to this invention is an insertable spacing element comprising a shell having cross section of octagon formed by four facets that are rounded and convex in the direction from the center of said element and by four facets located therebetween that are shaped and concave toward the center of the said element, wherein the convex facets are designed for being connected to a spacing grid cell and the concave ones are for fixing a fuel rod (EP 1679722, G 21 C 3/344, 7 Dec. 2006).

In the known fuel assembly the insertable spacing element is made in the form of a shaped shell rather reliably holding a fuel rod.

However, the convex surfaces of the known insertable element are, in practice, stiffening ribs that do not enable to assemble a bundle of fuel rods so as to ensure tightness between an insertable element and a fuel rod, which is required for guaranteeing a contact between a fuel rod and an insertable spacing element (in order to prevent vibration).

Unlike a convex surface, a flat surface of an insertable element provides spring properties to an insertable element that enable to compensate differences in geometry, misalignment of the axes of a fuel rod and an insertable element and maintain acceptable forces while passing a fuel rod through a spacing grid and ensuring assembly tightness.

The presence of plates connecting an insertable spacing element to the cell corners increases, on one hand, the stiffness of the cell in the whole, and increases, on the other hand, the cell hydraulic resistance due to formation of coolant flow vortexes downstream on the lower tie plate and then on the top tie plate.

Spacing of a fuel rod by making slots or cutouts in a shell results in the formation of resilient elements that do not have sufficient stiffness, and this allows the longitudinal axis of a fuel rod to move, during operation, relative to the longitudinal axis of the respective cell and, consequently, results in bending of that fuel rod.

The presence of "indirect" coolant flow swirlers made in the form of connecting plates and resilient elements, which fix a fuel rod, leads to insignificant mixing of a coolant flow only along such a fuel rod, while practically excluding mass transfer of a coolant flow between adjacent cells.

SUMMARY OF THE INVENTION

The objective of this invention is to develop and provide a fuel assembly and an insertable spacing element (insert) having improved characteristics.

The achievement of this objective enables to obtain technical effects in overall improvement of the cell stiffness and, at the same time, bending of fuel rods along a fuel assembly is reduced, as well as hydraulic resistance to a coolant flow is decreased and, at the same time, a degree of mixing a coolant flow between adjacent cells in a fuel assembly is increased; contact pressure on the fuel rod surface is reduced which means lower fretting wear of fuel rods.

The said technical effects may be achieved by providing a fuel assembly comprising spacing grids arranged along the assembly length downstream the coolant flow and comprising cells formed by orthogonal crossing plates, an insertable spacing element being arranged in each cell through which a fuel rod passes, said element embraces the respective fuel rod and is designed for fixing said fuel rod passing through said cell, wherein in said spacing grids that are arranged between the first and the last ones downstream the coolant flow at least some of cells, through which fuel rods pass, are provided with deflectors designed for mixing the coolant flow.

The distinctive feature of this invention is that in spacing grids that are arranged between the first and the last ones downstream the coolant flow at least some of cells, through which fuel rods pass, are provided with deflectors designed for mixing the coolant flow. In the result, the degree of mixing a coolant flow along the length of a fuel assembly is increased with decreasing hydraulic resistance. Hydraulic resistance of a fuel assembly is decreased due to the fact that deflectors, which are designed for mixing a coolant flow, are installed not on all spacing grids, but only on those that are arranged between the end spacing grids, i.e., on the grids that are arranged between the first and the last ones downstream the coolant flow. Indeed, a profile (distribution) of energy release downstream a coolant flow (i.e., along the core height) is such that values of the energy release are minimum in the lower and the upper sections of the reactor core, which ensures, naturally, minimum heating of a coolant in those sections.

Therefore, in accordance with this invention, it is necessary to provide deflectors only on the said spacing grids.

Furthermore, the said deflectors are preferably made in the form of bent vanes on crossing plates.

Preferably, a cell length along its longitudinal axis is selected in the range from 15 mm to 60 mm.

Furthermore, a size of an insertable spacing element arranged lengthwise in a cell is preferably selected in the range from 5 mm to 20 mm.

Also, the said insertable spacing element is preferably made with the closed contour, in particular, by pressing from a tube blank.

The said positive technical effects are also achieved due to the fact that an insertable spacing element is provided, which comprises a shell having cross section of octagon formed by four facets that are rounded and convex in the direction from the center of said element and by four facets located therebetween that are shaped and concave toward the center of the said element, said convex facets being designed for connection to a spacing grid cell and said concave facets being designed for fixing a fuel rod, wherein said concave facets have a straight section in their central parts.

The distinctive feature of this invention in relation to the insertable spacing element (insert) is that the concave facets have a straight section in their central parts.

In the result, the spacing element according to this invention has the following advantages over the known insertable element:

- as compared to surfaces that are convex toward the fuel rod axis, the flat facets of the inventive insertable element create contact pressure that is several times less, which reduces the risk of excessive damage to the fuel rod surface and decreases possibility and rate of fretting wear in operation;
- unlike a convex surface, the flat surface of the inventive insertable element ensures its spring properties enabling to compensate differences in geometry, misalignment of the axes of the fuel rod and the insertable element and maintain acceptable forces created while passing the fuel rod through a spacing grid when they are assembled tightly.

Furthermore, the rounding radius of the convex facets is in the range from 8.5 mm to 11 mm.

The straight section is preferably made to a length from 0.5 mm to 1.1 mm.

BEST MODE OF CARRYING OUT THE INVENTION

Figure 1:
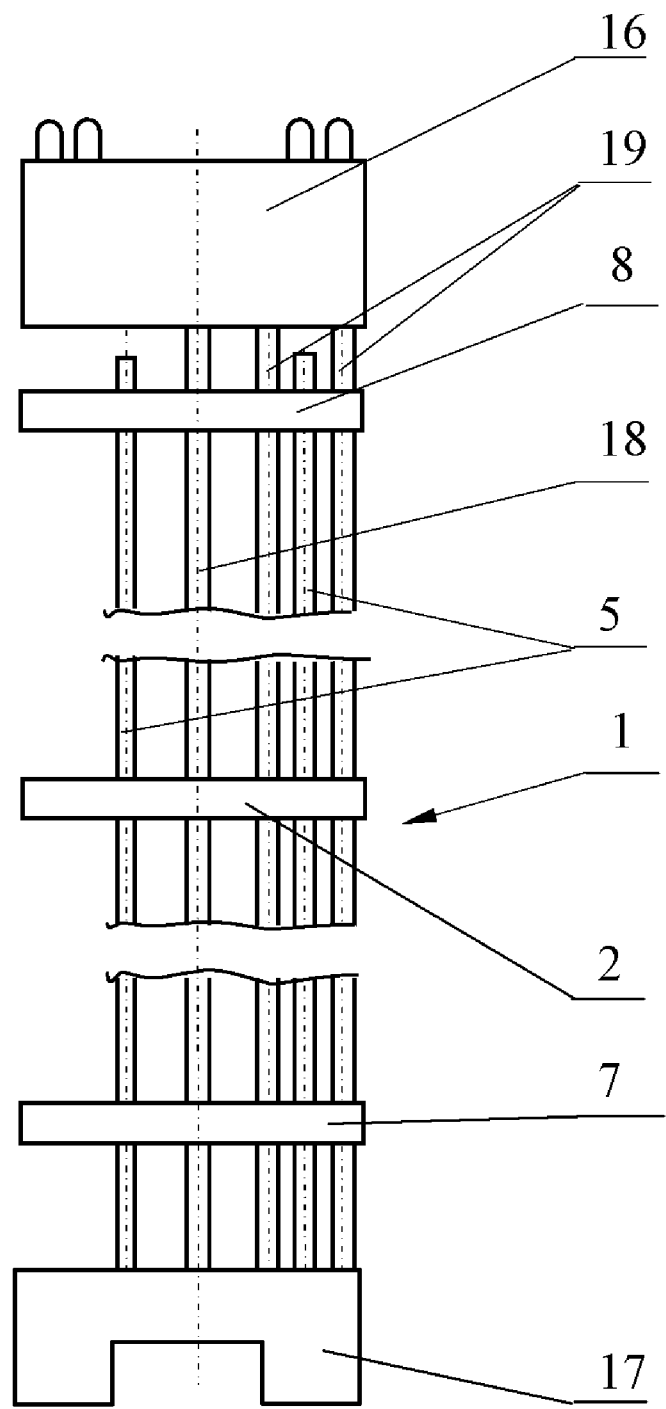
FIG. 1 shows a fuel assembly.
Figure 2:
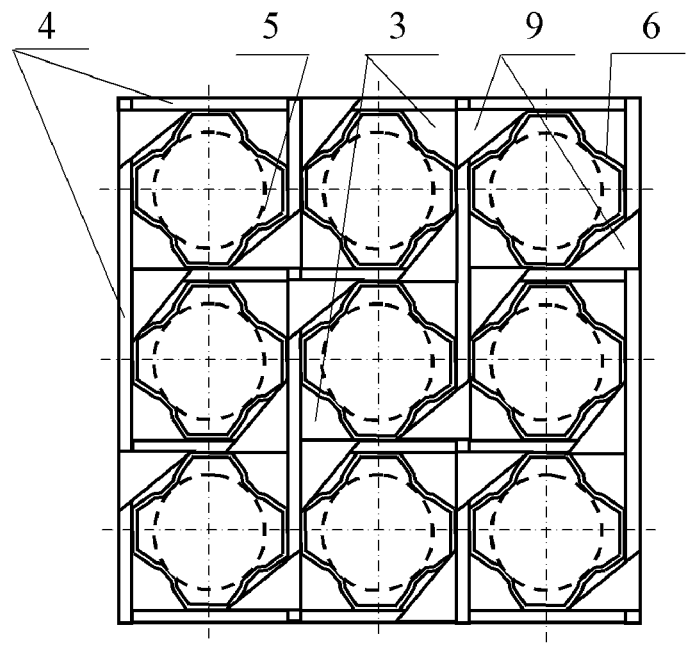
FIG. 2 shows a fragment of a spacing grid, which comprises 9 cells.
Figure 3:
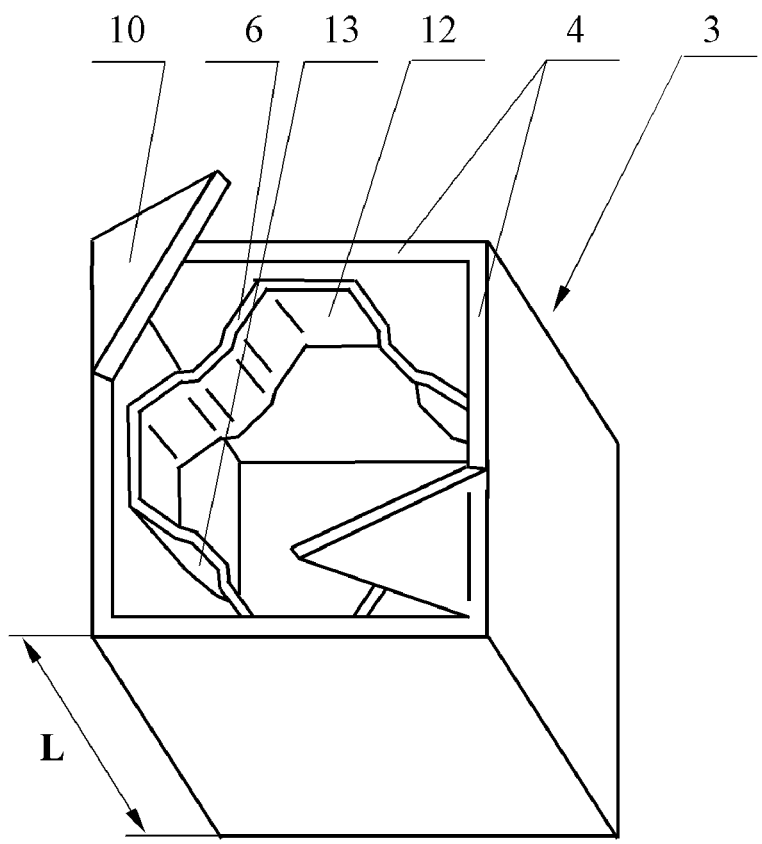
FIG. 3 shows one cell (enlarged view)
Figure 4:
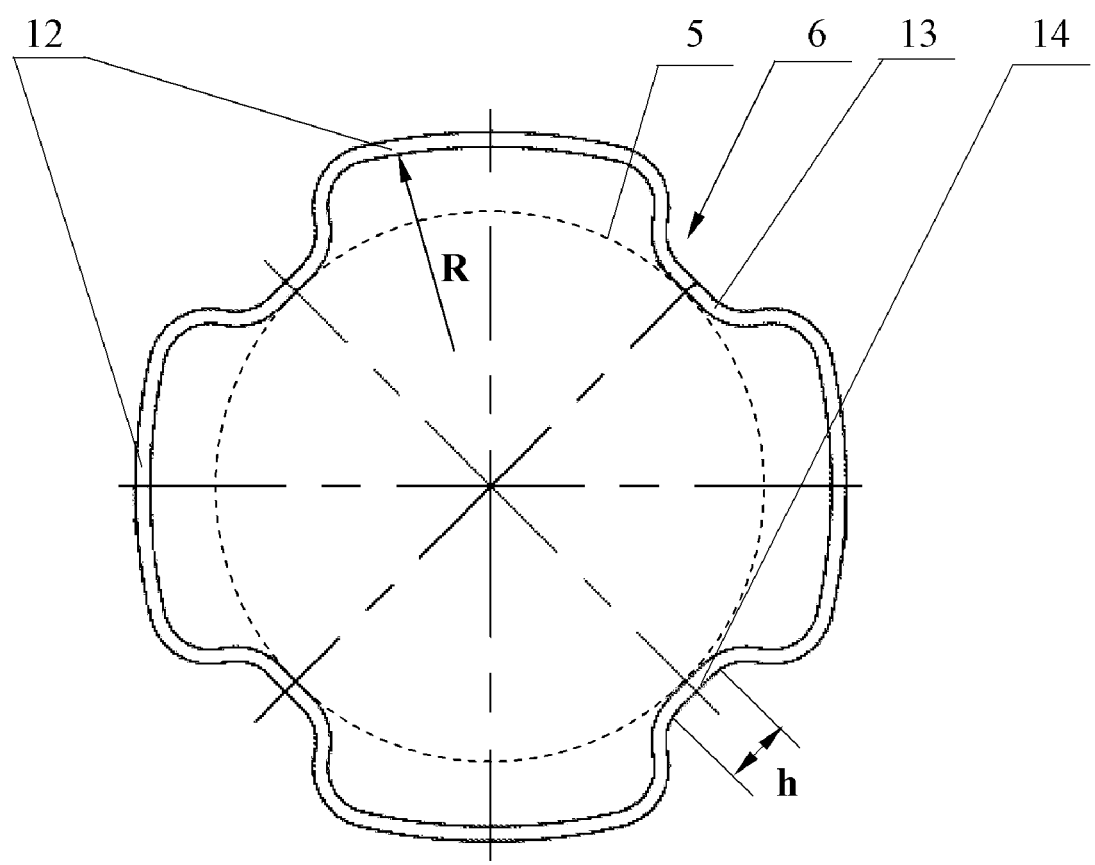
FIG. 4 shows a cross-section of an insertable spacing element (enlarged view)
Figure 5:
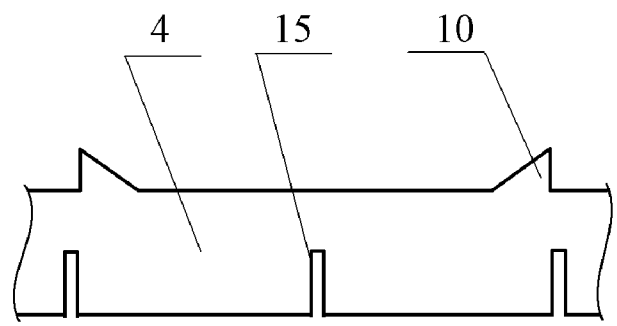
FIG. 5 shows a fragment of a plate (strip) having cutouts.
Figure 6:
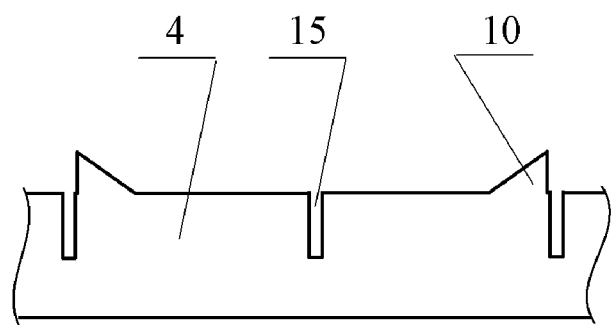
FIG. 6 shows a fragment of a plate (strip) that is orthogonal to the strip shown in FIG. 5.
Figure 7:
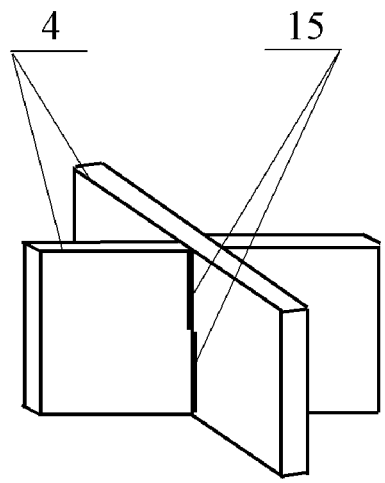
FIG. 7 shows a node of mutual crossing on cutouts of cell forming plates (strips).

A fuel assembly 1 comprises spacing grids 2 that are arranged along the length of the assembly 1 downstream a coolant flow. The spacing grids 2 comprise cells 3 formed by orthogonal crossing plates 4. Each cell 3, through which a fuel rod 5 passes, has an insertable spacing element 6 embracing the fuel rod 5 and designed for fixing the fuel rod 5 passing through the cell 3. In the spacing grids that are arranged between the first spacing grid 7 and the last spacing grid 8 downstream the coolant flow at least some cells 3, through which the fuel rods 5 pass, are provided with deflectors 9 designed for mixing the coolant flow. The deflectors 9 are made on the crossing plates 4 in the form of bent vanes 10. The length L of a cell 3 in the direction of its longitudinal axis is selected in the range from 15 mm to 60 mm. A size of the insertable spacing element 6 along the length L of a cell is in the range from 5 mm to 20 mm. The insertable spacing element 6 has a closed contour and may be made by pressing from a tube blank. The insertable spacing element 6 comprises a shell 11, which has a cross section in the form of an octagon formed by four facets 12 that are rounded and convex in the direction from the center of said element and by four facets 13 located therebetween that are shaped and concave toward the center of the said element. The convex facets 12 are designed for connection to a spacing grid cell, and the concave facets 13 are designed for fixing a fuel rod. The radius R of convex facet rounding is from 8.5 mm to 11 mm. The concave facets 13 have a straight section 14, which length h is from 0.5 mm to 1.1 mm, in their central parts. The cells 3 are formed by mutually arranging the plates (strips) 4 in the slots 15. For this the length of the strip should be at least one half of the width of the strip. The slots 15 on the orthogonally located plates (strips) 4 are oriented toward opposite directions. The fuel assembly also comprises the top nozzle 16, the bottom nozzle 17, the central tube 18 and the guide tubes 19.

The fuel assembly according to this invention works as follows. A coolant passes through the cells 3 and washes the surfaces of the fuel rods 5 located in the cells. At the exit from the cell 3 the coolant interacts with the vanes 10, which results in its mixing and, accordingly, in equalizing its temperature over the cross-section of the fuel assembly.

The fuel assembly and the insertable spacing element (insert) according to this invention may be made by any known method with the use of standard technologies and equipment and do not require creation of principally new tools.

What is claimed is:

1. A nuclear fuel rod assembly, comprising:
   a plurality of fuel rods, arranged vertically and in parallel to each other;
   a plurality of grids through which the fuel rods pass;
   the plurality of grids including a bottom grid, a top grid, and at least two intermediate grids between the top grid and the bottom grid;
   each grid formed of a plurality of perpendicularly flat plates, the flat plates forming substantially square cells;
   a plurality of deflectors formed integrally only with the flat plates of the intermediate grids, wherein each deflector is oriented at an angle to the vertical, and wherein each cell of the intermediate grid has only two opposing deflectors, wherein the top and bottom grids have no deflectors;
   each cell of each grid having a single insertable spacer having a substantially octagonal and axially symmetrical shape, the single insertable spacer having a closed contour in a cross-sectional view, the single insertable spacer formed of four convex surfaces and four concave surfaces, the four concave surfaces being in contact with the corresponding flat plates, and the four convex surfaces each having a flat portion that is in contact with the corresponding fuel rod and which is flat prior to insertion of the fuel rods, wherein opposite longitudinal surfaces of the single insertable spacer are parallel to each other, and wherein the single insertable spacer has no openings on its longitudinal surface.

2. The assembly of claim 1, wherein each concave surface has a flat portion in contact with a corresponding flat plate.

3. The assembly of claim 1, wherein the insertable spacers are formed as a tubular elements with a substantially octagonal cross-section.

4. A grid for a nuclear fuel rod assembly, the grid comprising:
   a plurality of perpendicularly flat plates, the flat plates forming substantially square cells;
   a plurality of deflectors formed integrally with the flat plates, wherein each deflector is oriented at an angle to a longitudinal axis of the grid, and wherein each cell has only two opposing deflectors;
   each cell having a single insertable spacer having a substantially octagonal and axially symmetrical shape, the single insertable spacer having a closed contour in a cross-sectional view, the single insertable spacer formed of four convex surfaces and four concave surfaces, the four concave surfaces being in contact with the corresponding flat plates, and the four convex surfaces each having a flat portion for fixing a corresponding fuel rod and which is flat prior to insertion of the fuel rods, wherein opposite longitudinal surfaces of the single insertable spacer are parallel to each other, and wherein the single insertable spacer has no openings on its longitudinal surface.

5. The grid of claim 4, wherein each concave surface has a flat portion in contact with a corresponding flat plate.

6. The grid of claim 4, wherein the insertable spacers are formed as a tubular elements with a substantially octagonal cross-section.

\* \* \* \* \*